United States Patent
Ammon et al.

(10) Patent No.: US 9,926,809 B2
(45) Date of Patent: Mar. 27, 2018

(54) METHOD FOR DISCHARGING EXHAUST GAS FROM A GAS TURBINE AND EXHAUST ASSEMBLY HAVING OPTIMISED CONFIGURATION

(71) Applicant: TURBOMECA, Bordes (FR)

(72) Inventors: Fabian Ammon, Baliros (FR); Alexandre Brisson, Ousse (FR); Guy Crabe, Gan (FR); Jacques Demolis, Lons (FR); Laurent Houssaye, Saint Faust (FR); Julien Munoz, Bougarbet (FR)

(73) Assignee: TURBOMECA, Bordes (FR)

( * ) Notice: Subject to any disclaimer, the term of this patent is extended or adjusted under 35 U.S.C. 154(b) by 521 days.

(21) Appl. No.: 14/368,554

(22) PCT Filed: Feb. 1, 2013

(86) PCT No.: PCT/FR2013/050222
§ 371 (c)(1),
(2) Date: Jun. 25, 2014

(87) PCT Pub. No.: WO2013/114058
PCT Pub. Date: Aug. 8, 2013

(65) Prior Publication Data
US 2014/0373546 A1    Dec. 25, 2014

(30) Foreign Application Priority Data

Feb. 1, 2012  (FR) ..................... 12 50934

(51) Int. Cl.
*F01D 25/30* (2006.01)
*F02K 1/82* (2006.01)
(Continued)

(52) U.S. Cl.
CPC ............ *F01D 25/305* (2013.01); *B01F 5/049* (2013.01); *B64D 33/04* (2013.01); *F01D 25/30* (2013.01);
(Continued)

(58) Field of Classification Search
CPC . F02K 1/822; F02K 1/82; B64D 33/04; F01D 25/30; F01D 25/305; F05B 2260/601; F02C 3/32; B01F 5/049
See application file for complete search history.

(56) References Cited

U.S. PATENT DOCUMENTS 4,018,046 A    4/1977  Hurley
4,178,760 A *  12/1979 Alf ........................... F01N 1/14
                                                                 137/527
(Continued)

FOREIGN PATENT DOCUMENTS

EP          1 780 124 A2    5/2007
WO       WO 03/037715 A1    5/2003

OTHER PUBLICATIONS

Hasinger, Investigation at supersonic and subsonic Mach numbers of auxiliary inlets supplying secondary air flow to ejector exhaust nozzle, 1975.*

(Continued)

*Primary Examiner* — William H Rodriguez
*Assistant Examiner* — William Breazeal
(74) *Attorney, Agent, or Firm* — Oblon, McClelland, Maier & Neustadt, L.L.P.

(57) ABSTRACT

A method for discharging exhaust gas from a gas turbine wherein a number of sectors, position, and angle at the center of at least one sector of a peripheral opening capable of forming an area for reingestion of a primary flow into an engine bay are determined by correlation of interactions between secondary cooling flows and the primary flow, from following behavior parameters: air gyration and speed at an inlet of a pipe, geometry of an exhaust stream, routing of the (Continued)

secondary cooling flow for cooling the engine bay, and a geometry and position of inlets of the secondary flows. The peripheral opening is then closed over the identified at least one angular sector. The method prevents backflow of hot primary air into the peripheral opening formed between a pipe and an ejector of the exhaust stream of a gas turbine.

8 Claims, 3 Drawing Sheets

(51) Int. Cl.
    *B01F 5/04* (2006.01)
    *F02C 3/32* (2006.01)
    *B64D 33/04* (2006.01)
(52) U.S. Cl.
    CPC .......... *F02C 3/32* (2013.01); *F05B 2260/601* (2013.01); *Y02T 50/672* (2013.01)

(56) References Cited

U.S. PATENT DOCUMENTS

| | | | | |
|---|---|---|---|---|
| 5,628,623 A | * | 5/1997 | Skaggs | F04F 5/466 417/151 |
| 6,202,413 B1 | * | 3/2001 | Baker | F01N 5/04 415/145 |
| 2003/0080244 A1 | * | 5/2003 | Dionne | B64D 33/08 244/57 |
| 2004/0060278 A1 | | 4/2004 | Dionne | |
| 2005/0274117 A1 | | 12/2005 | Sheoran et al. | |
| 2006/0059891 A1 | | 3/2006 | Sheoran et al. | |
| 2007/0063098 A1 | | 3/2007 | Dionne | |
| 2007/0089396 A1 | | 4/2007 | Anderson | |
| 2008/0245062 A1 | | 10/2008 | Dionne | |
| 2009/0288388 A1 | * | 11/2009 | Bies | F01D 25/30 60/226.1 |
| 2010/0300661 A1 | * | 12/2010 | Piesker | B01F 5/0471 165/111 |

OTHER PUBLICATIONS

Lakshiminarayana, Fluid Dynamics and Heat Transfer of Turbomachinery, 1996.*

International Search Report dated May 6, 2013, in PCT/FR13/050222 filed Feb. 1, 2013.

* cited by examiner

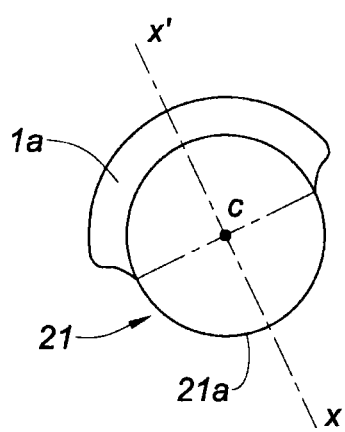
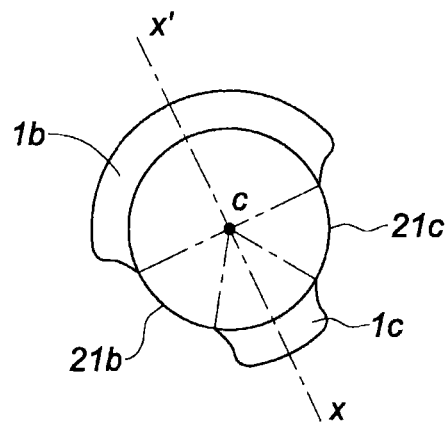
Fig. 3a　　　　　　Fig. 3b
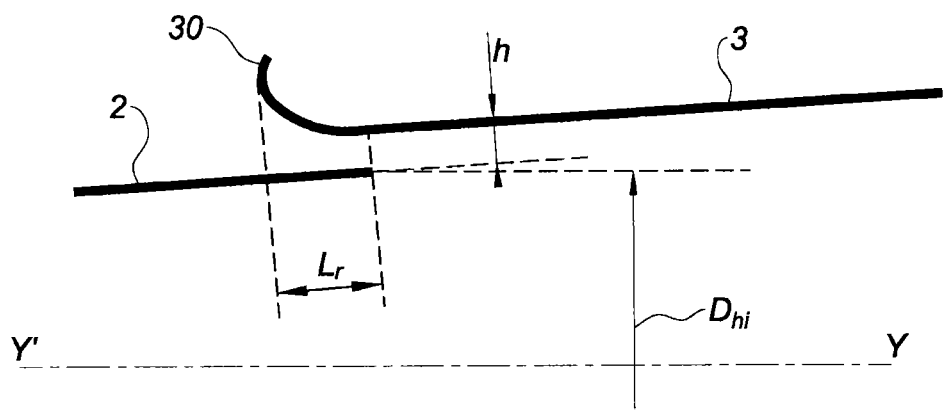
Fig. 4

METHOD FOR DISCHARGING EXHAUST GAS FROM A GAS TURBINE AND EXHAUST ASSEMBLY HAVING OPTIMISED CONFIGURATION

TECHNICAL FIELD

The invention relates to a method for discharging exhaust gas from a gas turbine and also to an exhaust assembly having a connection between a pipe and an ejector having a configuration suitable for carrying out this method.

The field of the invention relates to gas turbines and more particularly to the means dedicated to the discharge of gases emitted by these turbines.

The engines of helicopters conventionally comprise a gas generator (assembly of compressor, combustion chamber and turbine) which supplies a gas stream with substantial kinetic energy from a mixture of fuel and air under pressure injected into the combustion chamber, and a turbine driven in rotation by the gas stream in order to deliver mechanical power on an output shaft via a gear train.

This turbine, known as a power turbine, is coupled to an exhaust pipe which is itself extended by an ejector, the assembly being intended to maintain the static pressure at the free turbine outlet at a low level and to limit the losses of total pressure. Thus the output of the free turbine and exhaust assembly is improved and the mechanical power transmitted to the output shaft is increased. Moreover, the ejector can be advantageously bent in order to divert the gas stream outlet from the beam or rotor of the helicopter.

PRIOR ART

In order to ventilate and to cool the equipment (pump, alternator, electrical housings, etc.) of the engine M regardless of the operational status of the helicopter and engine assembly, the schematic sectional view of FIG. 1 illustrates the use of secondary flows of fresh air Fs, originating from the exterior at ambient pressure via inlet passages E1a, E1b of the engine cowling Mc and circulating in the engine bay Mb. The secondary flows Fs flow along the engine M and also along the primary pipe 2. At the rear end of the gas turbine, these flows Fs are at least partially drawn in through a peripheral opening 1 between the downstream end of the pipe 2 and the upstream end of the ejector 3 which surrounds said pipe at a distance. The secondary flows Fs are generated by the driving effect of the hot primary flow Fp exiting from the pipe 2 around the cone 4 and also by the effect of negative pressure generated by the shape of the ejector 3. The shape of the upstream end of the ejector 3 promotes the stability of the intake of secondary flows generated by these two effects. The horn shape of the upstream end of the ejector 3 is an example of this.

The nominal function of an ejector is to allow an intake of fresh air through the opening 1 formed between this ejector 3 and the pipe 2. However, at some engine speeds (take-off, transition phases, search and rescue conditions, landing, etc.) and in some flight conditions, hot primary air Fp can pass through this opening 1 in the reverse direction and is then partially driven back, in the direction of the arrows Fr, towards the engine bay Mb.

In this case, the engine bay Mb and the equipment are heated instead being cooled. In addition, the flow of secondary fresh air drawn in is then decreased and the cooling of the hot gases of the primary flow at the exhaust outlet is consequently attenuated.

Moreover the gyration of the air at the outlet of the turbine leads to the gyration of the air drawn in in the secondary flow FS through the peripheral opening 1. This is an additional phenomenon to be taken into account in the disturbances which can cause a backflow through the peripheral opening 1. Means are known for straightening the flow passing through the peripheral opening (EP 1780 124) of which the object is to decrease this backflow by increasing the downstream momentum. However these means do not guarantee a result at all the speeds of the engine and may be difficult to install when the ejector 3 is bent.

DESCRIPTION OF THE INVENTION

The invention aims to prevent the backflow of hot primary air via the peripheral opening described above. In order to do this, the invention provides for partially closing this peripheral opening in order to prevent the primary flow from flowing back into the engine bay.

More precisely, the present invention relates to a method for discharging exhaust gas from a gas turbine with the aid of an exhaust pipe for a primary hot gas flow, the gas turbine comprising an engine bay for engine equipment and provided with inlets for secondary flows of fresh air in order to ventilate the engine bay, to cool the engine equipment and the primary gas flow by mixing in the exhaust. The pipe is prolonged by an ejector which surrounds said pipe with a predetermined rate of overlap in order together to form a gas exhaust stream. A peripheral opening is formed between the pipe and the ejector. The position and the angle at the centre of at least one sector of the peripheral opening capable of forming an area for the reingestion of the primary flow into the engine bay are determined by correlation of the interactions between the secondary flows and the primary flow, from the parameters of air gyration and speed at the inlet of the pipe, the geometries of the exhaust stream and the engine bay, and also the geometry and position of the inlets of the secondary flows for cooling of the primary flow. Said peripheral opening is then closed over the angular sector(s) identified in this way.

According to preferred embodiments:
The peripheral opening height relative to the internal hydraulic diameter of the pipe is determined on the basis of the same parameters of air gyration and speed, exhaust geometry and the geometry of the secondary flows as above in order to prevent the reingestion of the primary flow;
the peripheral opening is closed over at least one angular sector extending at least partially diametrically opposite at least one secondary flow inlet of the engine bay;
the ejector forming an elbow in order to divert the outlet of the gas flows, the amplitude of the angle of the exhaust stream in the region of this elbow and the axial position of this elbow correlate with the amplitude of the angle of the sector to be closed;
in this last case, the peripheral opening is closed over at least one angular sector positioned on an upstream portion of external curvature formed by the elbow of the ejector.

The invention likewise relates to a gas turbine exhaust assembly suitable for carrying out the above method, comprising an engine bay and an exhaust pipe for a primary gas stream of hot gases. In this assembly, the pipe is extended by an ejector which overlaps said pipe over a given longitudinal distance, forming a peripheral opening between the pipe and the ejector. Inlet passages for secondary fresh air flows are arranged in an engine cowling which envelops the engine bay. The peripheral opening has at least one closure which extends over an angular sector at least equal to substantially 30 degrees.

According to advantageous embodiments:
- the closure of an angular sector is produced using a technology chosen from among bonding of a strip of composite material, welding of a strip of sheet metal, appropriate curvature of the ejector which is then coupled to the pipe, and fixing of the ejector on the pipe by rigid connection of opposite extension parts; these solutions have the advantage of avoiding the use of attachment tabs for retaining the ejector at its upstream end and which close the peripheral opening which has remained open;
- two closed sectors of the same extension are separated by an intermediate open sector, said intermediate open sector being generally diametrically opposite the rest of the peripheral opening;
- the two closed sectors extend over a range between 30 and 90° and the intermediate sector extends over a range between 30 and 60°;
- the interruption of opening, all closed sectors combined, extends substantially between 30 and 270°, preferably between 60 and 180°;
- the number of open sectors is at most equal to 5.

DESCRIPTION OF THE DRAWINGS

Other details, characteristics and advantages of the present invention will become apparent on reading the following description, which is not limited, with reference to the appended drawings, in which, respectively:

FIGS. 3a and 3b show schematic views in cross-section in the region of the pipe/ejector overlap with a coupling between the ejector and the pipe in order to form respectively one and two closed sectors according to the invention;

FIG. 4 shows a schematic view in longitudinal cross-section located in the region of an open sector between the pipe and the ejector;

DETAILED DESCRIPTION

In the present description, the term "longitudinal" means along the central line of the gas turbine, and the term "transverse" is defined as perpendicular to this axis and the term "radial" means extending in a transverse plane from this axis. The terms "upstream" and "downstream" relate to the overall flow direction of the air streams along the longitudinal axis of a gas turbine until their final discharge into the pipe. In the illustrated examples, helicopters are propelled by gas turbines. Moreover, identical reference signs refer to the passages in which these elements are described.

Figure 2:
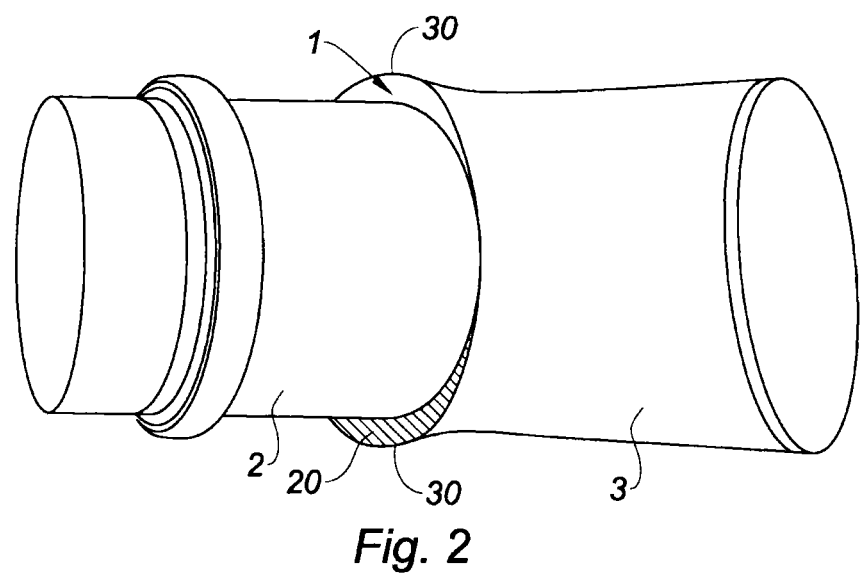
FIG. 2 shows a side view of the peripheral opening between a pipe and a bent ejector with an example of local closure of this pipe/ejector opening according to the invention.

With reference to the side view of the peripheral opening 1 of FIG. 2, an example of local closure of this opening 1 between a pipe 2 and a bent ejector 3 of a gas turbine is illustrated. This closure is produced by a part 20 attached to the pipe 2 and to the ejector 3 in the region of the upstream end 30 of the ejector forming the horn-shaped raised edge of this end. The part may be made of sheet metal or of composite material. Any appropriate rigid connection means can be used: welding, bonding, etc.

In the example, the closure part 20 extends over an angular sector substantially equal to 120°. According to other examples of embodiments illustrated by FIGS. 3a and 3b, the closed section 21 can extend respectively over a single sector 21a of approximately 180° (FIG. 3a) or over two sectors 21b and 21c each having an angle at the centre C equal to 60° (FIG. 3b). The closed sectors 21a and 21b-21c are complemented by open sectors 1a and 1b-1c.

In the example according to FIG. 3, the closed sectors 21b and 21c have the same extension and are separated by an intermediate open sector 1c having an angle at the centre C equal to approximately 60°, said intermediate open sector being overall diametrically opposite the rest of the peripheral opening 1b of greater amplitude than the intermediate sector 1c having an angle at the centre of approximately 180°. More precisely, the open sectors 1a, 1b and 1c extend symmetrically around the radial axis x'x oriented according to the position of the inlet of the secondary flow of fresh air, as described hereafter.

Moreover, the pipe/ejector positioning has the geometry illustrated in FIG. 4 in longitudinal cross-section along the axis Y'Y in the region of an open sector between the pipe 2 and the ejector 3. Two relative characteristics are advantageously determined on the basis of this geometry:
- the length of overlap "Lr", between the edge 30 of the ejector 3 and the end of the pipe 2, relative to the height "h" radially separating the pipe from the ejector, with $$1 \leq L_r/h \leq 15$$

- the amount of opening of the height "h" relative to the internal hydraulic diameter "$D_{hi}$" of the pipe 2, with $$3\% \leq h/D_{hi} \leq 12\%$$

Figure 1:
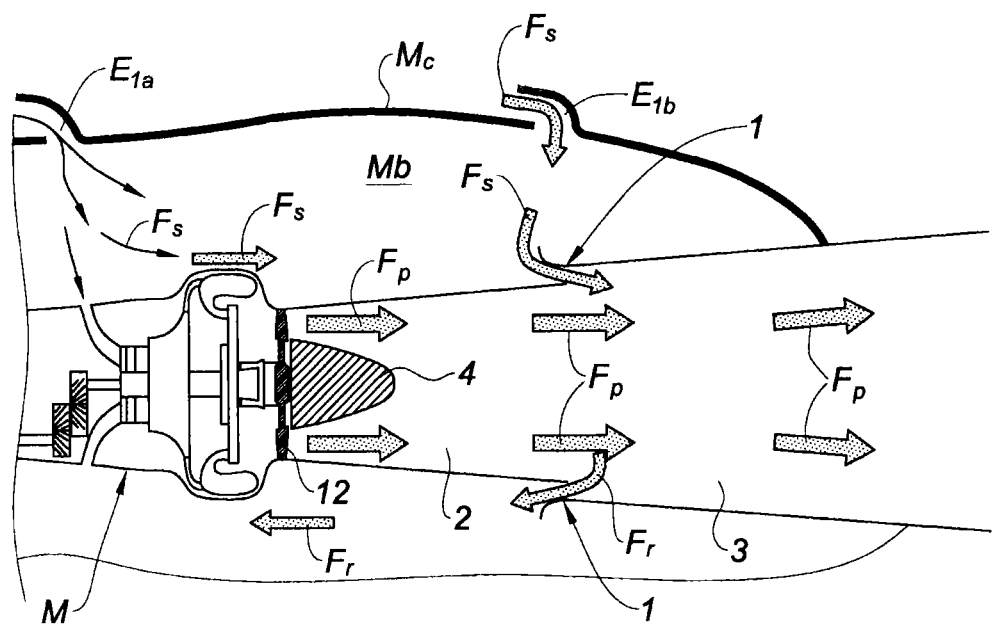
FIG. 1 shows a schematic view in partial longitudinal cross-section of a rear end of a gas turbine according to the prior art (already mentioned)

More generally, the position and the angle at the centre of the sectors of the peripheral opening are determined by correlation of the interactions by modelling for example with the aid of digital tools, between the secondary flows Fs and the primary flow Fp from the parameters of air gyration and speed at the inlet of the free turbine 12 (FIG. 1), geometries of the exhaust stream and the engine bay Mb, and also the geometry and position of the inlets of the secondary flows E1a and E1b. Said peripheral opening is therefore closed over the angular sectors identified in this way.

Figure 5:
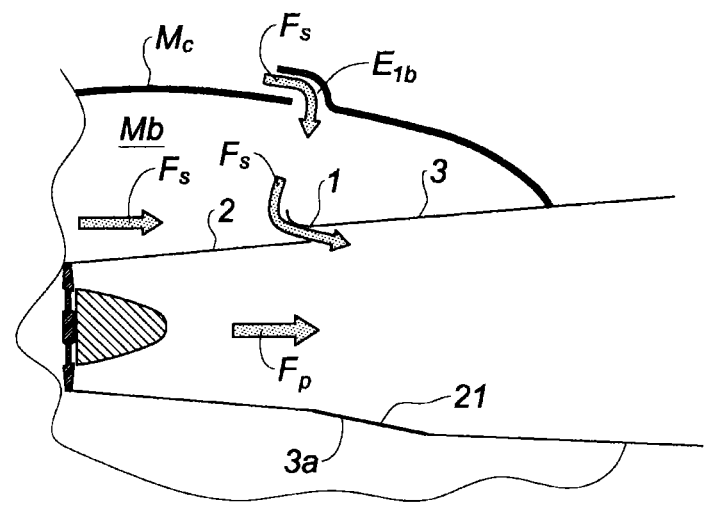
FIG. 5 shows a view in partial longitudinal cross-section of a rear end of a gas turbine according to FIG. 1 with an example of location of a closed section of an opening depending on the position of the inlet of the secondary flow for cooling of the primary flow.

An example of positioning of a closed section 21 of the peripheral opening 1 is presented with reference to the view in partial longitudinal cross-section of FIG. 5, relating to the rear end of a gas turbine. The closed section 21 extends with an appropriate curvature "continuously" from the upstream end 3a of the ejector 3 which is then coupled to the pipe 2. In this example, the last air inlet passage E1b of a secondary flow Fs is disposed radially in the same region as the intake of these secondary flows Fs into the opening 1 between the pipe 2 and the ejector 3. The section 21 in this case is positioned radially opposite the air inlet passage E1b of the secondary flow Fs through the engine cowling Mc of the engine bay Mb.

In general, a connection of the "continuous" type or similar has the advantage of being able to eliminate the fixing tabs between the pipe and the ejector, in particular when the closed sectors extend over more than 180°.

Figure 6:
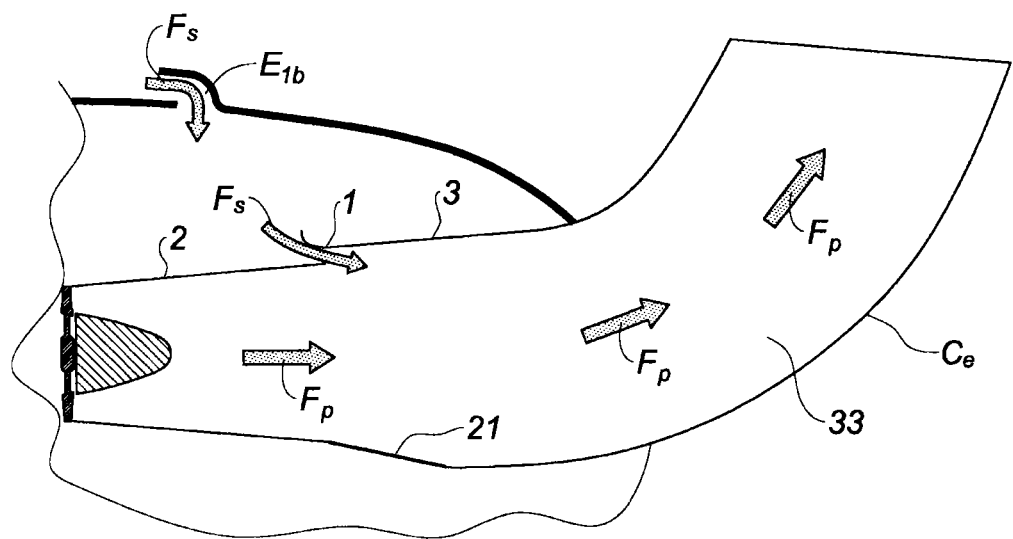
FIG. 6 shows a view in partial longitudinal cross-section of a rear end of a gas turbine according to FIG. 1 with an example of location of a closed section of an opening when the ejector is bent.

With reference to the view in partial longitudinal cross-section of FIG. 6, the rear end of a gas turbine comprises a bent ejector 3. The closed section 21 extends over an angular sector positioned on an upstream portion of external curvature Ce formed by the elbow 33 of the ejector.

The invention is not limited to the embodiments described and illustrated. In particular other configurations can be envisaged to guide the secondary flows in the engine bay in order to cool the primary flow.

Moreover, the gyration of the air at the free turbine outlet is a fundamental parameter for determining the gyration of the air at the pipe inlet. The geometry of the flow of exhaust gases depends in particular on a configuration of the flow path of the pipe that is at least partly symmetrical axially, and on the presence and number of branches or obstacles in the exhaust stream. The pipe and the ejector may comprise several elbows: the number and the position of the elbows can likewise be factors to be taken into account. In addition, with regard to the geometry of the engine bay as a parameter, it may be useful to take into account the presence of obstacles in the bay and of walls in contact with the secondary flows, as well as the number, the position and the configuration of the inlets of the secondary flows.

The invention claimed is:

1. A method for discharging gas turbine exhaust gas from a gas turbine engine comprising:
   providing an engine bay and, the gas turbine engine, an exhaust pipe, and an ejector,
   wherein the engine bay has an exterior and an interior inlets, and encloses an interior space which is contiguous, the inlets fluidly connecting the exterior to the interior space,
   wherein the interior space encloses the gas turbine engine, the exhaust pipe, and the ejector, and
   wherein the exhaust pipe has a first end and a second end, the first end of the exhaust pipe being joined to the gas turbine engine:
   providing at least one circumferential opening radially between the second end of the exhaust pipe and the ejector, wherein the ejector radially overlays and is radially spaced from the second end of the exhaust pipe, and wherein each circumferential opening subtends a respective opening angle circumferentially with respect to a center of the ejector:
   providing at least one circumferential closure each subtending a respective closure angle circumferentially with respect to the center of the ejector, where for each circumferential closure the second end of the exhaust pipe is joined to the ejector by a respective seal thereby preventing fluid flow between the engine bay and the ejector via each circumferential closure; and
   discharging gas turbine exhaust into the exhaust pipe thereby causing ambient air from the inlets to flow into the ejector via the at least one circumferential opening thereby forming a mixture of gas turbine exhaust and ambient air, and causing the mixture to exit the ejector.

2. A method for discharging gas according to claim 1, wherein a radial spacing between the second end of the exhaust pipe and the ejector is determined based on air in circular or spiral motion and speed at the first end of the exhaust pipe, and geometry of the engine bay, the exhaust pipe, and the ejector.

3. A method for discharging gas according to claim 1, wherein each seal is at least partially diametrically opposite a respective circumferential opening.

4. A method for discharging gas according to claim 1, wherein the ejector forms an elbow to divert the mixture, an amplitude of an angle of the mixture in a region of the elbow and an axial position of the elbow correlate with an amplitude of the angle of the circumferential closure.

5. A method for discharging gas according to claim 4, wherein each seal is positioned on an upstream portion of external curvature formed by the elbow of the ejector.

6. A method for discharging gas according to claim 1, wherein each seal is produced using a technology chosen from among bonding of a strip of composite material, or welding of a strip of sheet metal, having appropriate curvature of the ejector which is then coupled to the exhaust pipe, and fixing of the ejector on the exhaust pipe by rigid connection of opposite extension parts.

7. A method for discharging gas according to claim 6, wherein the at least one circumferential closure comprises two circumferential closures that are separated by an intermediate open sector, the intermediate open sector being diametrically opposite a remainder of the at least one circumferential opening.

8. A method for discharging gas according to claim 1, wherein a sum of all of the respective opening angles is from 90 to 330 degrees, and a sum of all of the respective closure angles is from 30 to 270 degrees.

* * * * *